W. T. CARNES.
LATHE.
APPLICATION FILED SEPT. 17, 1918.
1,379,393.
Patented May 24, 1921.
6 SHEETS—SHEET 1.
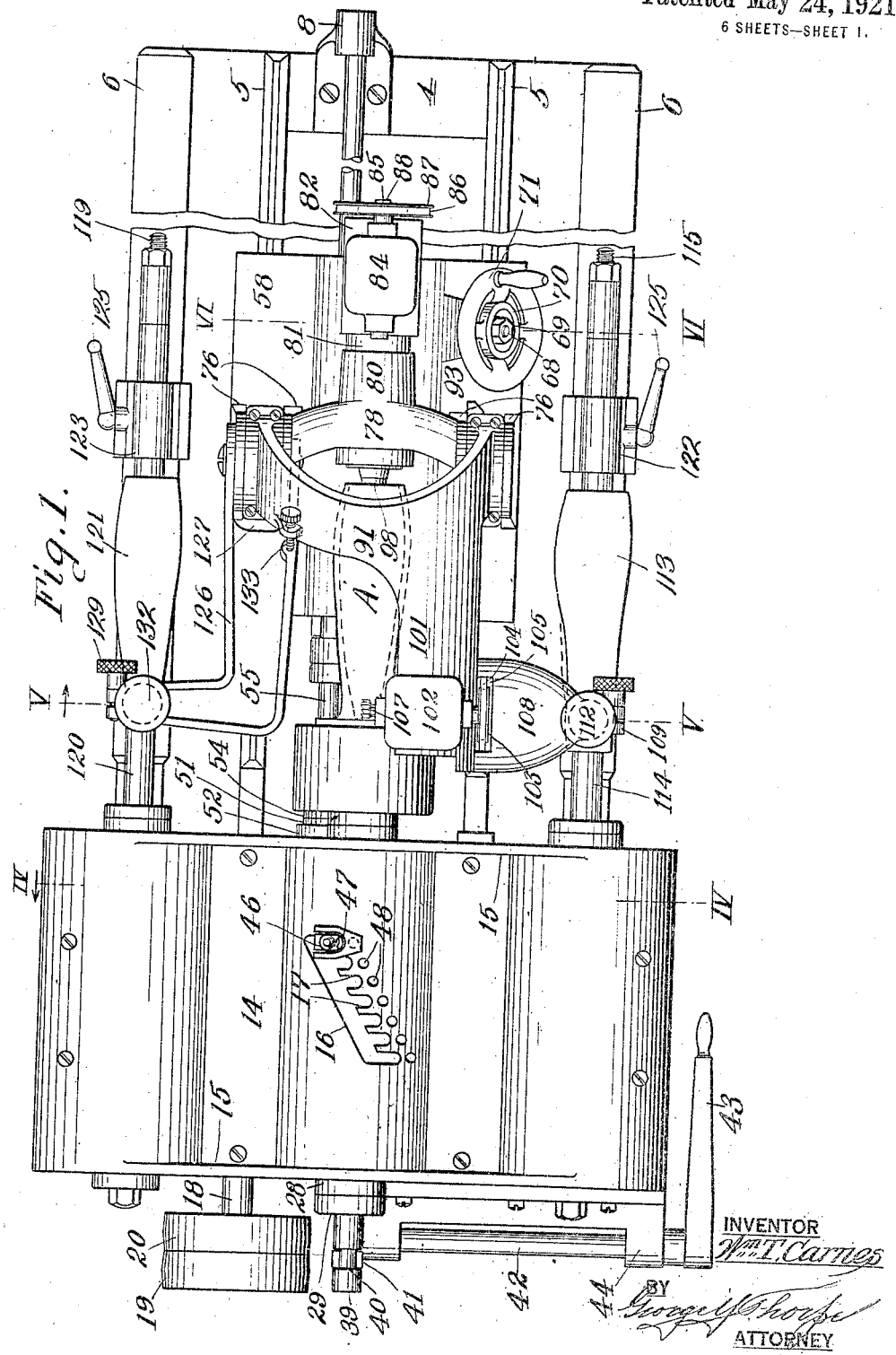
INVENTOR
Wm. T. Carnes
BY George J. Thorpe
ATTORNEY

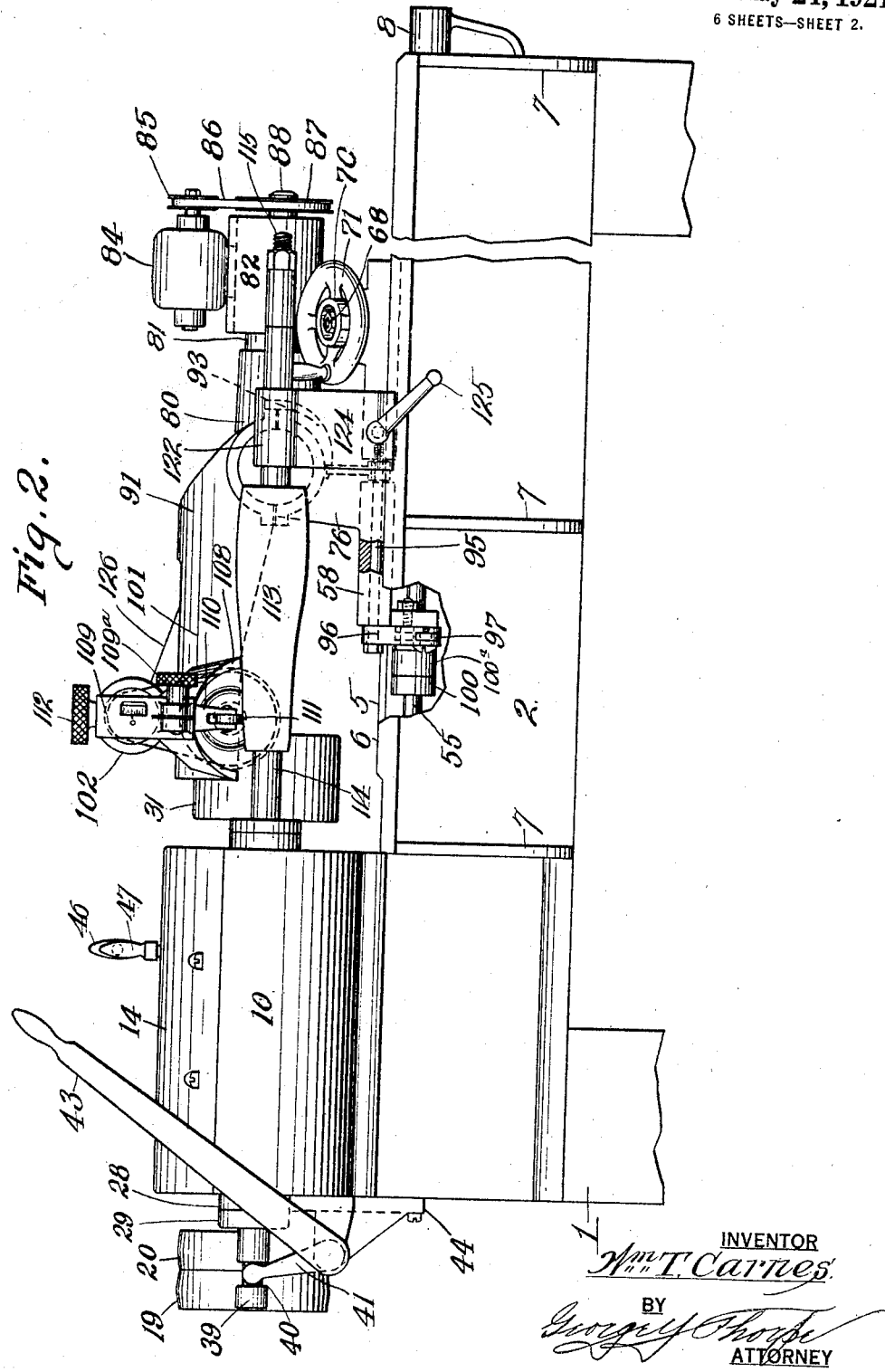

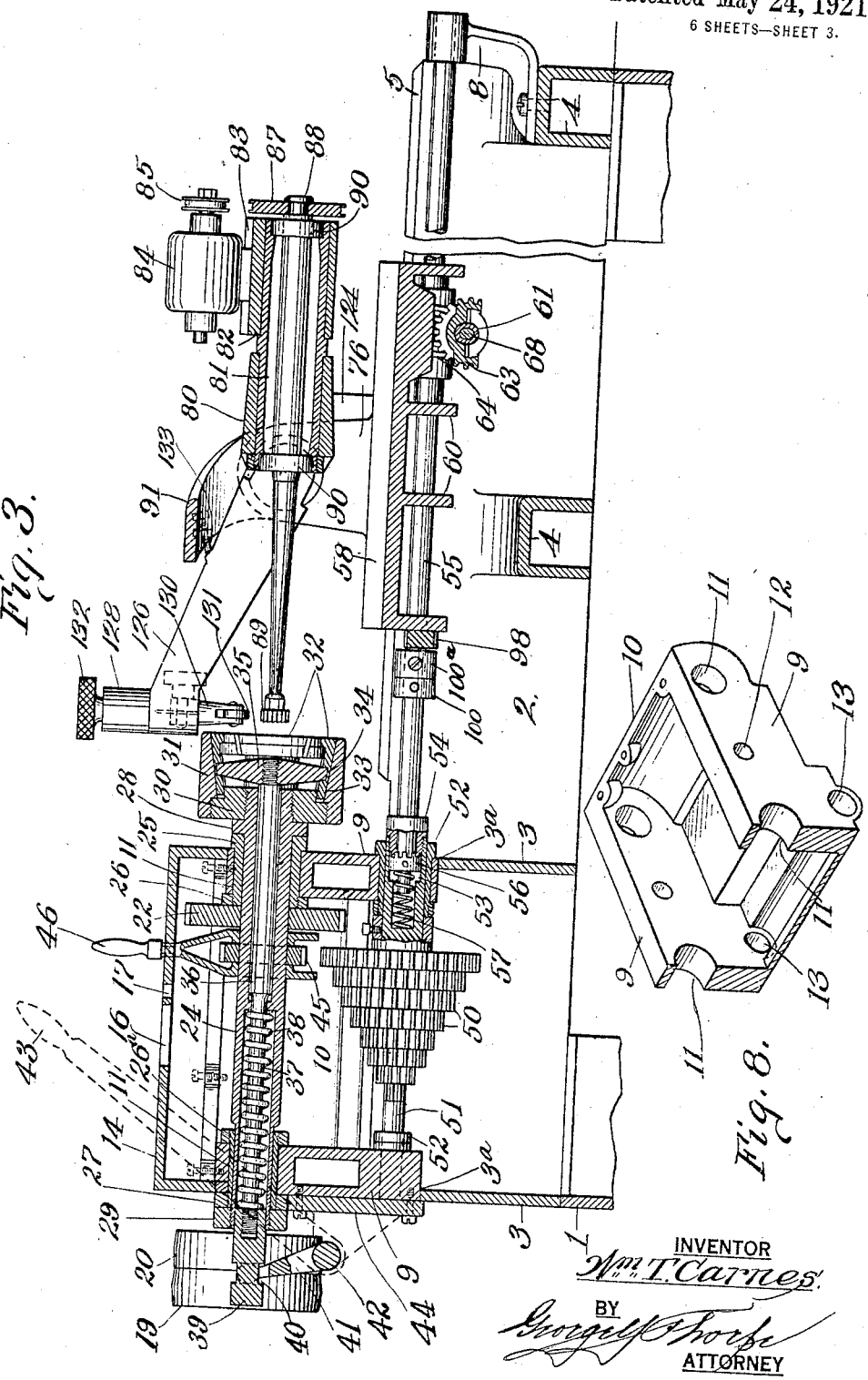

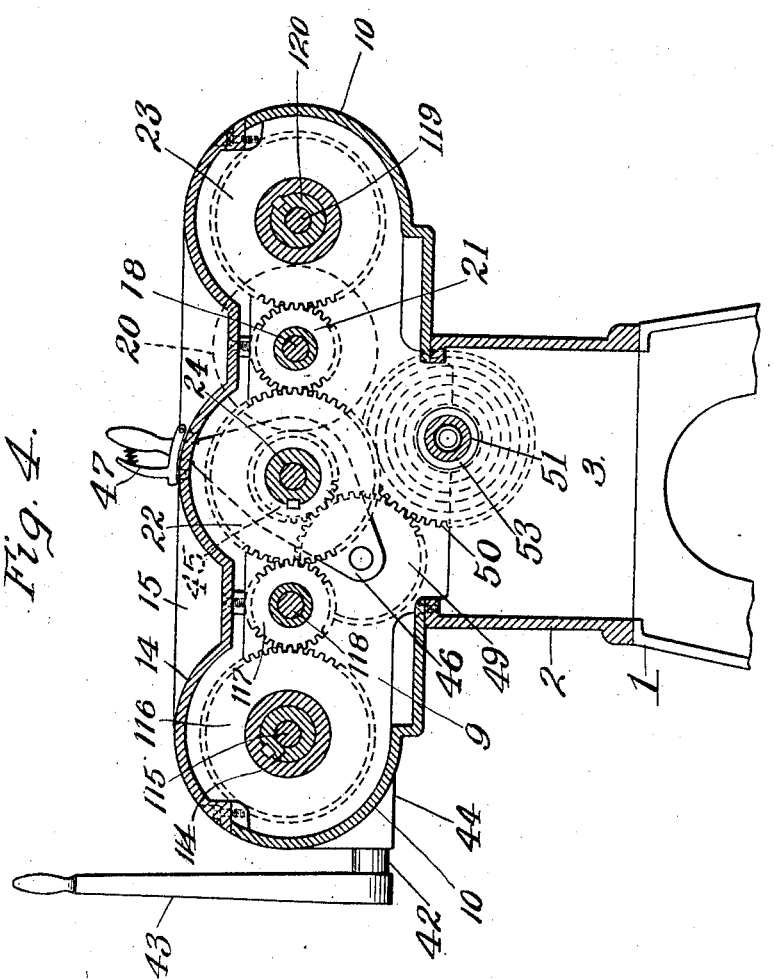

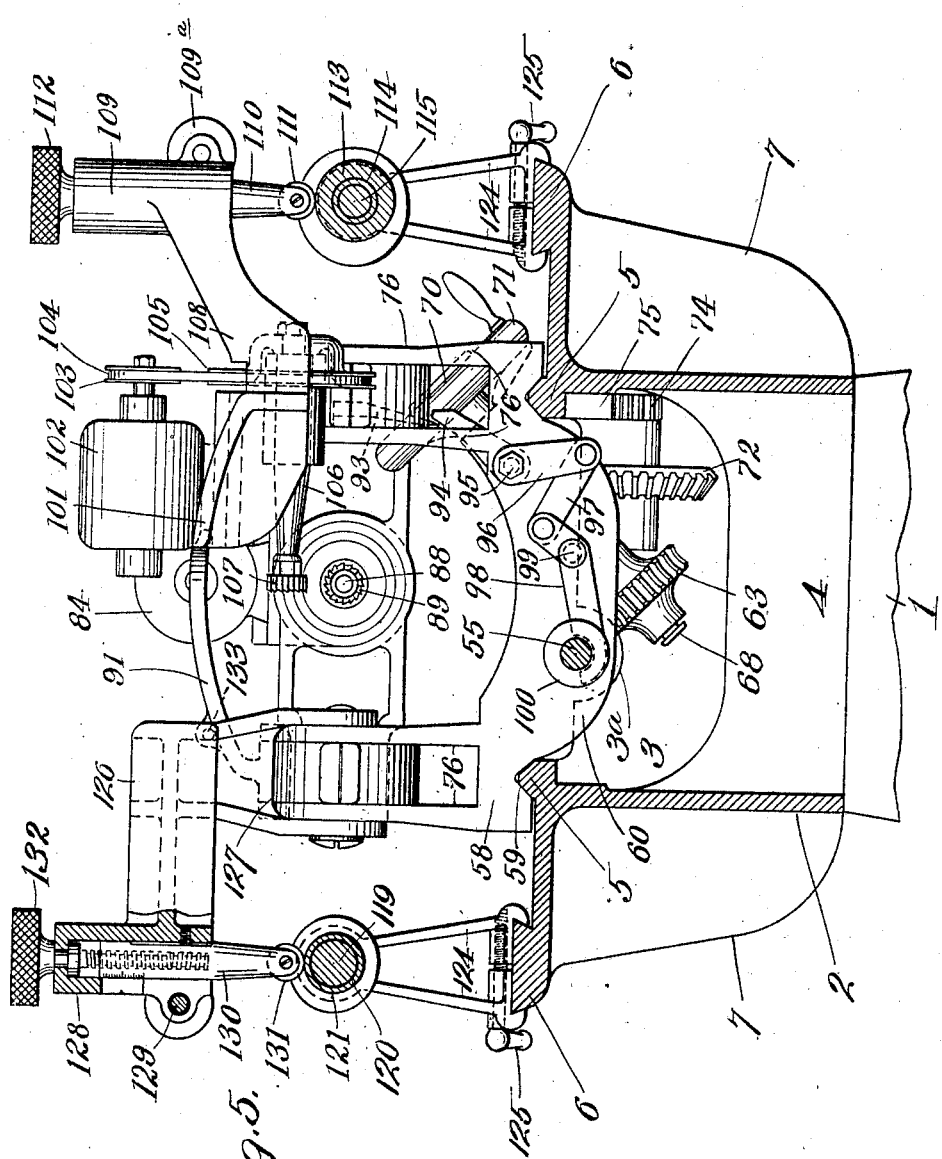

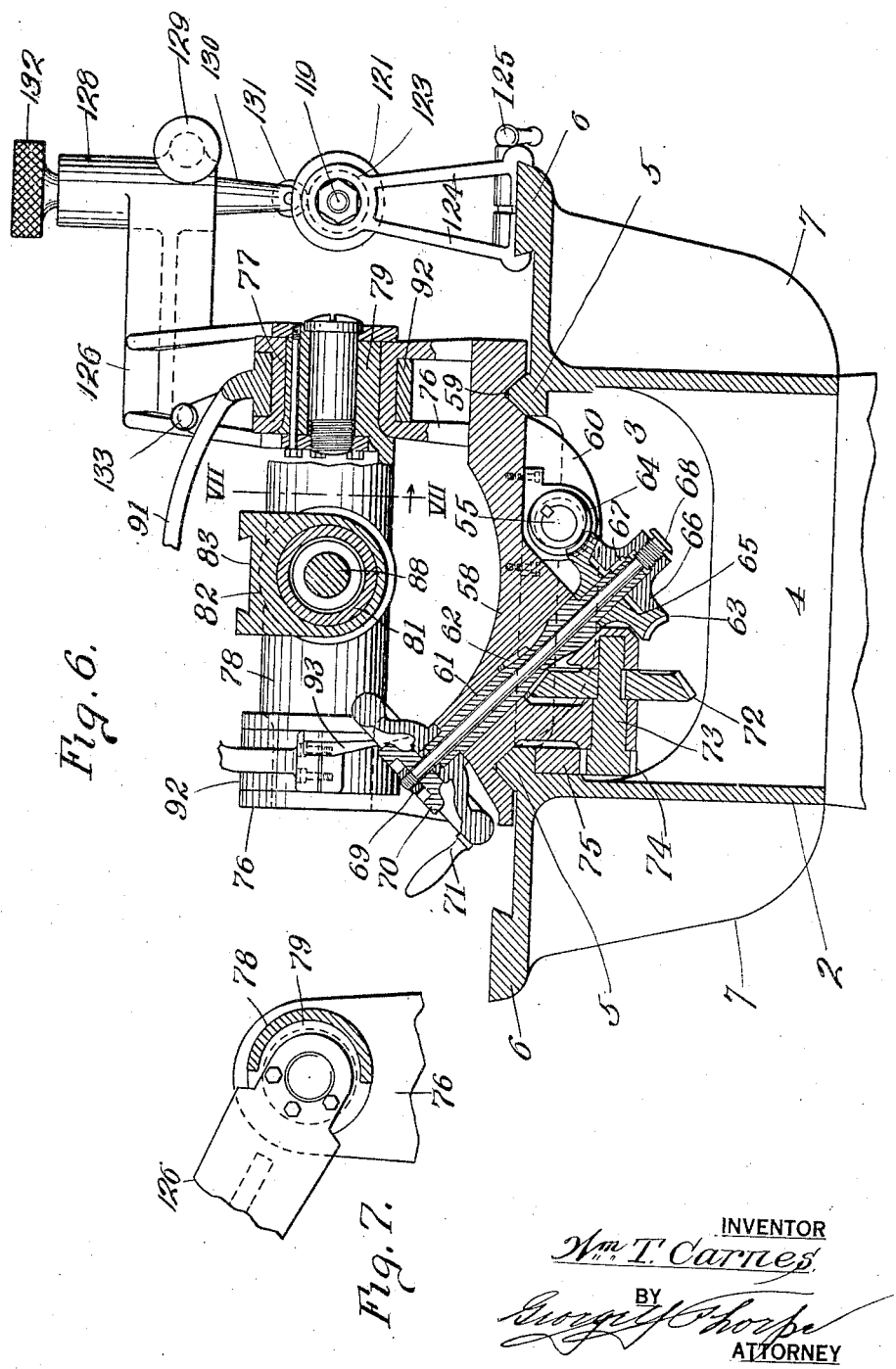

UNITED STATES PATENT OFFICE.

WILLIAM T. CARNES, OF KANSAS CITY, MISSOURI, ASSIGNOR TO CARNES ARTIFICIAL LIMB CO., OF KANSAS CITY, MISSOURI, A CORPORATION OF MISSOURI.

LATHE.

1,379,393.           Specification of Letters Patent.      Patented May 24, 1921.

Application filed September 17, 1918. Serial No. 254,411.

*To all whom it may concern:*

Be it known that I, WILLIAM T. CARNES, a citizen of the United States, residing at Kansas City, in the county of Jackson and State of Missouri, have invented certain new and useful Improvements in Lathes, of which the following is a specification.

This invention relates to lathes, and more especially to lathes for turning artificial limb sockets, the chief object of the invention being to produce a machine for simultaneously turning and boring an arm socket or the like, regardless of differences in contour between the socket chamber and the external contour of the limb.

With this and other objects in view, the invention consists in certain novel and useful features of construction and combinations of parts as hereinafter described and claimed; and in order that it may be fully understood reference is to be had to the accompanying drawing, in which:

Figure 1, is a top plan view of a socket boring and turning lathe embodying the invention.

Fig. 2, is a side elevation of the same, broken away to expose parts otherwise hidden.

Fig. 3, is a section chiefly in the vertical plane of the longitudinal center of the machine, but broken away to disclose the clutch relation between the variable speed power transmission shaft and the carriage-feeding shaft.

Fig. 4, is a vertical cross section taken on the line IV—IV of Fig. 1.

Fig. 5, is an enlarged cross section taken substantially on the line V—V of Fig. 1.

Fig. 6, is a vertical cross section taken on the line VI—VI of Fig. 1, but on the same scale as Fig. 5.

Fig. 7, is a section on the line VII—VII of Fig. 6.

Fig. 8, is a fragmentary perspective view of one-half of a bearing frame forming a part of the machine.

In the said drawings where like reference characters refer to corresponding parts, 1 indicates the supporting legs of a skeleton bed, consisting of a pair of parallel walls 2 connected at one end and near such end respectively by cross pieces 3, and at intervals by cross braces 4. The walls are formed from a point adjacent the rearmost of said cross pieces 3, with a pair of parallel shears 5 and outward thereof with brackets 6 braced at intervals by external vertical ribs 7.

At the rear end of the machine a bearing bracket 8 is secured to the adjacent cross brace 4, the bore of said bracket being axially alined with a pair of segmental recesses 3ª formed in the upper edges of the cross pieces 3. Superposed upon and rigidly secured to the cross pieces 3, in any suitable manner, is a bearing frame consisting of a pair of parallel vertical walls 9 connected by end pieces 10, and said walls 9 are of considerable width to provide extended bearing openings 11 and 12. Of the bearing openings 11 one is disposed in the vertical plane of the longitudinal center of the bed and the others of which there are two, lie in the same horizontal plane as and at opposite sides of and equal distances from the said central bearing opening, the bearing openings 12 being disposed centrally between adjacent bearing openings 11. The bearing frame is also provided with alined bearing openings 13 lying in a plane below that of the openings 11 and slightly to one side of the vertical plane of the central openings 11.

14 is the cover for the bearing frame, the same being bolted or otherwise secured upon said frame, said cover comprising arched portions in the vertical planes of the bearing openings 11 and flat portions connecting the arched portions. The cover is stiffened by upstanding flanges 15, and the central arched portion is provided with an oblique slot 16 having offsets or pockets 17 in one of its walls.

A driving shaft 18 equipped at its front end with fast and loose pulleys 19 and 20 respectively, is journaled in one set of bearing openings 12, and secured on said drive shaft is a gear pinion 21, meshing with gear wheels 22 and 23, the former being secured upon a tubular chuck shaft 24 journaled in a pair of bushings 25, fitting in the central set of bearing openings 11. One of the bushings 25 is headed at one end and engaged at the opposite end by a nut 26 to prevent endwise movement.

The other bushing is equipped with a head 26ª and a nut 27 to engage the bearing frame and prevent endwise movement, and endwise movement of the chuck shaft in the bushings is prevented by an enlargement 28 formed near the rear end of the shaft, and a nut 29 secured upon its front end. The chuck head consists of a large collar 30 and a ring 31 secured to the collar 30 and beveled at its inner side to provide a flaring mouth. 32 indicates a plurality of chuck jaws fitting in the chuck head, and adapted to engage the front end of and firmly support a block to be turned and bored to constitute the socket piece or hollow artificial arm A. The said jaws are provided with shanks 33 slidingly engaging and of the same bevel or taper as said mouth, and said shanks are provided with openings 34 engaged by a spider 35 mounted on the rear end of a rod 36 extending slidingly through the tubular driving shaft 24. The rod 36 within an enlargement of the bore or passage of the tubular shaft, is of reduced diameter and is encircled by a coiled expansion spring 38 bearing rearwardly at one end against said tubular shaft, and forwardly against a head 39 secured to rod 36 and fitting slidingly in shaft 24. The head 39 of rod 36 is provided with an annular groove 40 engaged by the free end of a crank arm 41 on a rock shaft 42. The rock shaft is provided with a handle 43 at one side of the machine for manual operation to open or close the chuck jaws. The shaft 42 is journaled in a bearing bracket 44 secured to the front end of the machine frame.

A gear pinion 45 is mounted to rotate with and slide upon shaft 24, and is fitted within a bifurcated or forked frame 46 mounted to slide and oscillate upon said shaft 24, the arrangement being such that when it slides it moves the gear pinion 45, but does not move the same when oscillated. The handle end of the frame 46 is adapted for adjustment in the oblique slot 16, and to be secured at the desired point of adjustment by engagement with the desired recess or pocket 17. To lock the lever, however, it is provided with the customary hand grip-latch 47 for interlocking engagement with the adjacent socket 18 of a series paralleling the slot 16. By gripping the lever and incidentally the latch, the latter may be tripped and with the former oscillated slightly and then advanced obliquely within slot 16 until opposite the desired recess or socket 17. In this oblique adjustment of the handle, it is caused to turn upon shaft 24 and causes the gear wheel 49 which it carries in intergeared relation with pinion 45, to move into engagement with one or another member of a cone gear 50 rigidly secured upon a longitudinal power transmission shaft 51 journaled in bushings 52 secured in bearing openings 13 of the bearing frame. At its rear end shaft 51 is enlarged and provided with a longitudinal socket 52 wherein is rigidly secured a forwardly facing clutch member 54. A longitudinal carriage-operating shaft 55 is journaled at its rear end in the bearing bracket 8 and at its front end is journaled in the clutch member 54, and within the socket 53 of shaft 51, is equipped with a rearwardly facing clutch member 56, held by the pressure of a spring 57 in engagement with clutch member 54, so that power may be transmitted from shaft 51 to shaft 55 to operate the same at a speed proportionate to the ratio existing between the gear wheel 49 and the engaged member or section of the cone gear 50.

A carriage 58 is provided in its underside with grooves 59 engaged by the shears 5 of the frame, and said carriage is provided with a plurality of depending cross ribs 60 through which shaft 55 extends. Journaled in the carriage is an inclined tubular shaft 61 equipped at an intermediate point with a bevel pinion 62 and at its lower end said shaft forms a journal for a worm wheel 63 meshing with a worm gear 64 keyed to slide with the carriage upon and turn with shaft 55. The worm wheel is provided with a tapered socket 65 forming a clutch member, a companion clutch member 66 being keyed at 67 to shaft 61 to slide thereon and rotate therewith. Clutch member 66 is also threaded upon the lower end of a rod 68 journaled in and extending through shaft 61, and engaged at its upper end by clamping nut 69 for clamping a hand wheel 70 upon said rod whereby the latter may be turned to clutch or unclutch said clutch members. The hand wheel 70 overlaps a larger hand wheel 71 secured upon the upper end of shaft 61 in order that gear pinion 62 may be turned manually as well as automatically from shaft 55 to operate a bevel gear 72 secured on a short shaft 73 journaled in the carriage and provided with a pinion 74 meshing with a longitudinal rack bar 75 secured to one wall of the bed, see Fig. 6. From the above it will be seen that transmission of power from shaft 51 to shaft 55, effects automatic adjustment or travel of the carriage 58 if the clutch members are in clutched relation, and simply rotates the worm gear wheel 63 inoperatively if unclutched from clutch member 66. It will also be apparent that when said clutch members are unclutched, the wheel 71 can be turned by hand to effect longitudinal adjustment of the carriage.

A pair of standards 76 extend from opposite sides of the bed and are provided with transversely alined journal openings 77. An oscillatory frame comprises a cross piece 78 terminating in cylindrical trunnions 79 journaled in bearing openings 77, and said cross piece is provided midway its length with a central hub portion 80 wherein is secured the front part of a longitudinally extending sleeve 81. The rear portion of said sleeve carries a block 82 equipped with a longitudinal dove-tail groove 83 wherein is adjustably secured the base of an electric motor 84, provided with a pulley 85 connected by a belt 86 with a pulley 87 secured rigidly on the rear end of the spindle 88 of a cutting tool or bur 89, cased ball bearings 90 of conventional type, being interposed between the spindle and the sleeve 81 to insure operation of the spindle with the minimum of friction. The oscillatory cross piece is adapted to maintain the cutter or bur 89 in the same vertical plane as the axis of the chuck shaft 24, but is capable of adjustment to dispose said cutter or bur above or below the horizontal plane of said shaft, as hereinafter more particularly explained.

A yoke 91 is formed at its ends with bearing rings or collars 92 mounted rotatably on standards 76 of the carriage, and one of said bearing rings or collars 92 is provided with a cam 93 (see Fig. 6 and in dotted lines Fig. 5) for operating a lever 94 and thereby turning a shaft 95 journaled in the carriage. The shaft is equipped at its front end with a depending crank 96 connected by a link 97 with the short arm of a bell crank 98 pivoted at 99 to the front end of the carriage, the long arm of the bell crank being adapted to fit against the underside of shaft 55 and rearward of one of a set of collars 100 secured on shaft 55.

When the bell crank 98 is disposed as shown in Fig. 5, it will be apparent that by contact with the adjustable collar 100$^a$, it will impart forward sliding movement to the shaft 55 and thus disengage clutch member 56 from clutch member 54 and instantly arrest the rotation of said shaft and the parts driven thereby. The adjustment of collar 100$^a$ thus determines the forward limit of travel of the carriage and hence the depth to which a socket is to be cut by the cutter or bur 89.

The oscillatory yoke 91 is provided at one side with an extension 101 upon which is mounted an electric motor 102 provided with a drive pulley 103 connected by a belt 104 to a pulley 105 secured to one end of the transversely arranged spindle or shaft 106, of a cutter 107, said cutter being disposed vertically above the axial plane of the cutter 89, and adapted for externally shaping the block of wood destined to form an artificial limb socket.

The extension 101 of the yoke is provided with a lateral arm 108 through which said drive belt 104 extends, and said arm 108 is equipped at its outer end with a vertically arranged split clamping sleeve 109, operated by a thumb screw 109$^a$. Arranged within the clamping sleeve is a slide pin 110 provided at its lower end with an antifriction roller 111 and engaged at its upper end by a vertical screw 112, whereby it may be adjusted to dispose the roller 111 in proper relation with a form 113, produced by a plastic cast or otherwise, to serve as the pattern whereby the cutter 107 shall properly contour block A. The form 113, hereinafter termed the external form, is mounted in any suitable manner upon a tubular shaft 114 fitting upon a shaft 115 journaled in one set of the openings 11 in the bearing frame, and equipped within said frame with a gear wheel 116 meshing with a gear pinion 117 journaled upon a stub shaft 118 secured in one of the openings 12 of the bearing frame. The gear pinion 117 meshes with and is driven by the gear wheel 22, (see Fig. 4), it being noticed that the gear wheel 23 is also mounted upon and drives a shaft 119 at the opposite side of the longitudinal center of the machine from shaft 115, and that a tubular shaft 120 is secured upon shaft 119 and carries a form 121 for determining the internal contour of the block A. The tubular shafts 114 and 120 are respectively journaled in bearings 122 and 123 surmounting diverging legs 124 dove-tailed upon ribs 6, and clamped thereon at the desired point of adjustment by screws 125, it being understood that these bearings are made adjustable to accommodate forms of different length.

126 is an angle arm bifurcated at 127 to receive the upper end of a standard 76, and fastened rigidly to the corresponding trunnion 79 of cross piece 78 cut away as shown in Fig. 7 to accommodate one arm of the bifurcated portion of the said angle arm, and said angle arm at its outer end which overhangs shaft 120, terminates in a split clamping sleeve 128 for actuation by a screw 129 upon a vertical pin 130 provided with an antifriction roller 131 engaging the form 121, a screw 132 serving to effect vertical adjustment of roller 131 to accommodate a form for any vertical diameter and contour.

In boring and turning a socket piece to form an artificial limb, with comparatively thin walls in order that it may be made as light as possible, it frequently occurs that due to difference of contour internally and externally the socket is cut completely through at some particular point, and that the internal and external cutters come in conflict. To avoid the possibility of ruining a socket piece and perhaps also the cutters, I have provided means for limiting the downward movement of the external cutter so that it shall be positively arrested when it reaches a point about the minimum thickness of the wall desired from the cutter 89. This means consists of a set screw 133 mounted in the yoke piece 91 so that it shall be eventually arrested in its downward movement with the yoke by engagement with the arm 126, as shown clearly in Figs. 1 and 3.

To operate the machine, a block of wood is fitted at one end between the clutch jaws while the latter are advanced to open them through the control lever 43, the release of the lever permitting the spring 38 to withdraw and close the clutch jaws tightly upon the block, the taper wall or mouth of the clutch head imparting inward movement to the jaws, it being understood, of course, that the carriage is withdrawn the requisite distance to permit the block to be interposed in the path of the cutter 89. It will also be understood that the bore-controlling and external contour-controlling forms are mounted on the shafts 119 and 115 respectively and that the pins 130 and 110 are advanced to cause their respective antifriction rollers to engage said forms at the rear or enlarged ends thereof. Power is then imparted to shaft 18 through the medium of the fast pulley 19 or its equivalent, and from said shaft is transmitted through the gearing described to the chuck, the two form-carrying shafts, shaft 51 and shaft 55, the latter through mechanism described causing the pinion 74 to travel on rack 75 and effect advance movement of the carriage, it being understood, of course, that the motors 84 and 102 are in operation for the purpose of driving the cutters and causing them to perform their respective functions, and from what has already been stated, it will be apparent that the boring cutter moves up and down according to the contour of the form 121 and hence produces a bore or opening in the block which exactly matches the external contour of said form. At the same time the external cutter 107 externally contours the block to correspond exactly with the external form 113, and it will be apparent that due to proper preliminary adjustment of the set screw 133, it will be impossible for the external cutter to ever approach so near the internal cutter as to cut an opening in the wall of the block or to conflict with said internal cutter. It will, therefore, be understood that should the bore controlling form at a particular point be of greater radius than the radius of the external contouring form and should it happen that said parts of said form are simultaneously in the radial planes of their respective antifriction rollers 131 and 111, the two cutters would come together with destructive results and would incidentally cut an opening in the wall of the block. This contingency is avoided before beginning the contouring operation by holding the two cutters spaced apart to the minimum width of socket wall desired, and then adjusting the set screw until it bears down upon the arm 126. It will thus be understood that in the event of a contingency such as mentioned, the set screw by engagement with arm 126 would momentarily relieve the external form of the duty of guiding and controlling the up and down movement of the external cutter, but that said form would always be the controlling factor until the wall of the socket piece was turned down to the minimum thickness.

Normally the bell crank 98 is disposed in the path of the stop collar $100^a$ so that by striking said collar it shall advance shaft 55 and thereby unclutch it from the cone gear shaft 51 and arrest the carriage. Sometimes it is desirable to extend the socket boring operation after the external contouring operation is completed. To accomplish this the yoke 91 is swung upward by hand to inoperative position to cause the cam 93 to operate crank arm 94, and through shaft 95, arm 96 and link 97, swing the bell crank 98 downward out of the path of the stop collar. The carriage will, therefore, continue its advance movement until it strikes said collar and effects the unclutching of shaft 55 from shaft 51. The advance of the carriage can be shortened by adjusting collar $100^a$ rearwardly upon shaft 55, but should the operator fail to secure said collar tightly on the shaft in its new position, the carriage will eventually be arrested without damage, because it will slide the said collar forward until it strikes the fixed collar 100 when the unclutching operation will take place. Of course, if undesirable extended movement of the cutters and hence of the carriage occurs, the block being operated upon may be wasted.

Different bore and external contouring forms can be easily and quickly secured in position, and the supporting brackets 123 are made adjustable on the ribs 6 to accommodate forms of different length.

It will be apparent that the carriage can be operated with different speeds by the adjustment of the speed changing mechanism, and that it may be adjusted manually by turning the hand wheel 71 after unclutching the clutch member 66 from worm wheel 63. This will, of course, be done when the carriage is to be returned to its original position preliminary to the next advance movement.

From the above description it will be apparent that I have produced a machine of the character described possessing the features of advantage pointed out as desirable in the statement of the object of the invention, and I wish it to be understood that while I have described and illustrated the preferred embodiment of the invention I reserve the right to all changes which may properly fall within the appended claims.

I claim:

1. In a lathe, the combination of a driven chuck for supporting a block, a pair of driven shafts at opposite sides of and parallel with the chuck, a bore contouring form on one of said shafts and an exterior contouring form on the other shaft, a carriage for travel in a direction parallel with said shafts, a driven cutter carried by said carriage for boring said block, means engaging and controlled by the form for determining the boring by said cutter, for oscillating the latter during the boring operation, an oscillatory yoke mounted upon the carriage and engaging the form for determining the external shaping of the block, and a driven cutter carried by said yoke, engaging the exterior surface of said block to externally contour the same.

2. In a lathe, the combination of a driven chuck for supporting a block, a pair of driven shafts at opposite sides of and parallel with the chuck, a bore contouring form on one of said shafts, and an exterior contouring form on the other shaft, a carriage for travel in a direction parallel with said shafts, a driven cutter carried by said carriage for boring said block, means engaging and controlled by the form for determining the boring by said cutter, for oscillating the latter during the boring operation, an oscillatory yoke mounted upon the carriage and engaging the form for determining the external shaping of the block, a driven cutter carried by said yoke, engaging the exterior surface of said block to externally contour the same, and means whereby the means for controlling the oscillatory action of the first-named cutter shall limit the depth of cut produced in the block by the other cutter.

3. In a lathe, the combination of a driven chuck for supporting a block, a pair of driven shafts at opposite sides of and parallel with the chuck, a bore contouring form on one of said shafts and an exterior contouring form on the other shaft, a carriage for travel in a direction parallel with said shafts, a driven cutter carried by said carriage for boring said block, an oscillatory device mounted upon the carriage and carrying said cutter to oscillate the same, an arm movable with said oscillatory device, a device carried by said arm adjustable radially toward and from the bore controlling form and engaging the same, an oscillatory yoke mounted upon the carriage, a device carried thereby and adjustable radially toward and from the other form, a driven cutter carried by the oscillatory yoke and externally engaging said block, and means for arresting the carriage when the boring cutter has attained the desired depth within said block.

In testimony whereof I affix my signature.

WILLIAM T. CARNES.